(12) United States Patent
Jaquinta

(10) Patent No.: US 9,047,588 B2
(45) Date of Patent: Jun. 2, 2015

(54) E-MAIL PROTOCOL FOR INSTANT MESSAGE

(75) Inventor: Joseph M. Jaquinta, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 2340 days.

(21) Appl. No.: 11/314,555

(22) Filed: Dec. 21, 2005

(65) Prior Publication Data

US 2007/0143426 A1 Jun. 21, 2007

(51) Int. Cl.
*G06F 15/16* (2006.01)
*G06Q 10/10* (2012.01)

(52) U.S. Cl.
CPC .................... *G06Q 10/107* (2013.01)

(58) Field of Classification Search
CPC .................................... G06Q 10/107
USPC ............... 709/205, 206, 207; 707/1, 102
See application file for complete search history.

(56) References Cited

U.S. PATENT DOCUMENTS

| 6,151,621 | A | 11/2000 | Colyer et al. |
| 6,539,421 | B1 | 3/2003 | Appelman et al. |
| 2002/0073162 | A1 | 6/2002 | McErlean |
| 2003/0140103 | A1 | 7/2003 | Szeto et al. |
| 2004/0128356 | A1 | 7/2004 | Bernstein et al. |
| 2004/0158611 | A1* | 8/2004 | Daniell et al. ............... 709/206 |
| 2004/0172454 | A1 | 9/2004 | Appelman et al. |
| 2004/0215721 | A1* | 10/2004 | Szeto et al. ................... 709/204 |
| 2004/0224769 | A1 | 11/2004 | Hansen et al. |
| 2005/0005014 | A1 | 1/2005 | Holmes et al. |
| 2005/0009541 | A1* | 1/2005 | Ye et al. ........................ 455/466 |
| 2005/0138002 | A1* | 6/2005 | Giacobbe et al. ................ 707/3 |

FOREIGN PATENT DOCUMENTS

| KR | 20030004702 A | 1/2003 |
| KR | 20040072200 A | 8/2004 |
| WO | WO 01/93503 A2 | 12/2001 |

* cited by examiner

*Primary Examiner* — Peter Shaw
(74) *Attorney, Agent, or Firm* — Ryan Lewis; Hoffman Warnick LLC

(57) ABSTRACT

Allowing a message, composed as an instant message, to be transmitted using an e-mail protocol and displayed at a recipient as an instant message or an e-mail is disclosed. In particular, on a message originator, one embodiment includes, composing a message as an instant message, and transmitting the message using an e-mail protocol. On a message recipient, one embodiment includes, receiving a message in an e-mail protocol, determining whether the message is to be displayed as an instant message, and in the case that the message is to be displayed as an instant message, displaying the message as an instant message at the recipient, otherwise displaying the message as an e-mail at the recipient. Functionality of the originator and recipient sides can be combined into a single client.

19 Claims, 6 Drawing Sheets

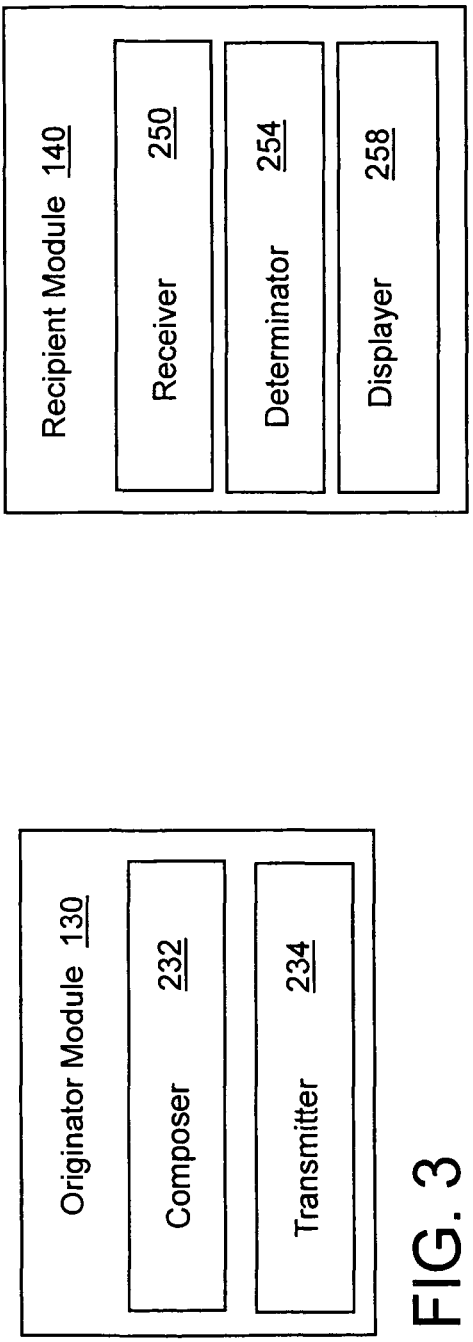
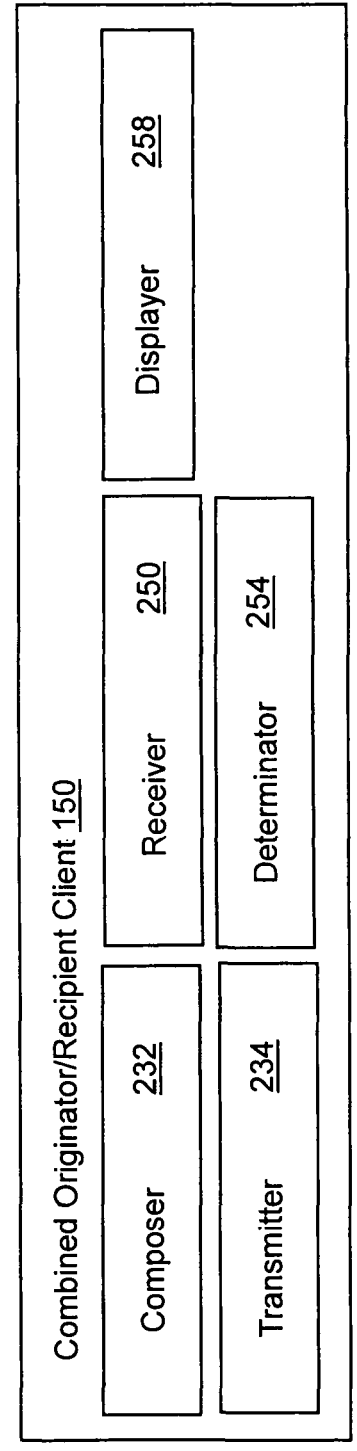

E-MAIL PROTOCOL FOR INSTANT MESSAGE

BACKGROUND OF THE INVENTION

1. Technical Field

The invention relates generally to electronic communication, and more particularly, to methods, program products and a system for allowing a message, composed as an instant message or an e-mail, to be transmitted using an e-mail protocol and displayed as an instant message or an e-mail at a recipient.

2. Background Art

Instant messaging (IM), some times referred to as chat, has become a popular method for people to communicate electronic messages to one another quickly. There are a variety of instant messaging (IM) systems available to the public, for example, Yahoo Instant Messenger, AOL Instant Messenger, Microsoft Messenger, and Sametime. IM systems allow messages generated on a client to be routed through a centralized server and to one or more recipient IM clients. One challenge faced by the IM industry is that each IM system uses a different network and protocol. Unfortunately, no standardization allowing exchange of instant messages between the different IM systems has been achieved to date.

One current approach to solving this problem is the construction of a number of consolidating applications that allow the different IM systems to interact. Trillium and IBM Community Tools are examples of these consolidating applications. These consolidating applications include code to interface with two or more of the IM systems, and give the appearance of a single user interface. However, no true intercommunication is possible between the different systems.

Another approach is to avoid instant messaging altogether and rely on electronic mail (e-mail). Originally e-mail filled the role of an electronic replacement for paper memos and letters. However, e-mails do not have to be long documents, and may be relatively short. For example, it is not uncommon to see chains of e-mails each containing one (new) line as part of an ongoing dialog. Essentially this sort of e-mail is fulfilling the role of IM systems. However, no interaction between IM systems and e-mail systems currently exists.

Another challenge for the IM industry is that existing IM systems, as noted above, all employ centralized client-server applications. Consequently, they have a single point, the server, which is subject to load, denial of service attacks, and single point of failure problems.

There is a need in the art for a solution to the above problems of the related art.

SUMMARY OF THE INVENTION

Allowing a message, composed as an instant message, to be transmitted using an e-mail protocol and displayed at a recipient as an instant message or an e-mail is disclosed. In particular, on a message originator, one embodiment includes, composing a message as an instant message, and transmitting the message using an e-mail protocol. On a message recipient, one embodiment includes, receiving a message in an e-mail protocol, determining whether the message is to be displayed as an instant message, and in the case that the message is to be displayed as an instant message, displaying the message as an instant message at the recipient, otherwise displaying the message as an e-mail at the recipient. Functionality of the originator and recipient sides can be combined into a single client.

A first aspect of the invention provides a method for communicating a message, the method comprising the steps of: composing a message as an instant message; and transmitting the message using an e-mail protocol.

A second aspect of the invention provides a method for receiving and displaying a message, the method comprising the steps of: receiving, at a recipient, a message in an e-mail protocol; determining whether the message is to be displayed as an instant message; and in the case that the message is to be displayed as an instant message, displaying the message as an instant message at the recipient, otherwise displaying the message as an e-mail at the recipient.

A third aspect of the invention provides a program product stored on a computer-readable medium, which when executed, communicates a message, the program product comprising: program code for composing a message as an instant message; and program code for transmitting the message using an e-mail protocol.

A fourth aspect of the invention provides a program product stored on a computer-readable medium, which when executed, receives and displays a message, the program product comprising: program code for receiving, at a recipient, the message in an e-mail protocol; program code for determining whether the message is to be displayed as an instant message; and program code for displaying the message as an instant message in the case that the message is determined to be displayed as an instant message, otherwise displaying the message as an e-mail at the recipient.

A fifth aspect of the invention provides a system for composing and displaying of a message as an instant message or an e-mail, the system comprising: a composer for composing a transmit message as one of: an instant message and an e-mail message using a first client; a transmitter for transmitting the transmit message in an e-mail protocol; a receiver for receiving a received message in an e-mail protocol; a determinator for determining whether the received message received by the receiver is to be displayed as an instant message; and a displayer for displaying the message as an instant message in the case that the message is determined to be displayed as an instant message, otherwise displaying the message as an e-mail.

A sixth aspect of the invention provides a computer-readable medium that includes computer program code to enable a computer infrastructure to communicate a message and/or receive and display a message as an instant message or an e-mail, the computer-readable medium comprising computer program code for performing the method steps of the invention.

An seventh aspect of the invention provides a business method for communicating a message and/or receiving and displaying a message as an instant message or an e-mail, the business method comprising managing a-computer infrastructure that performs each of the steps of the invention; and receiving payment based on the managing step.

A eighth aspect of the invention provides a method of generating a system for communicating a message and/or receiving and displaying a message as an instant message or an e-mail, the method comprising: obtaining a computer infrastructure; and deploying means for performing each of the steps of the invention to the computer infrastructure.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 3 shows a block diagram of one embodiment of an originator module according to the invention.

FIG. 6 shows a block diagram of one embodiment of a recipient module according to the invention.

FIG. 8 shows a block diagram of one embodiment of a combined originator/recipient client according to the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

The following headers are provided for organization purposes only: I. Introduction, II. Environment Overview, III. Operational Methodology, IV. Special Situations, and V. Conclusion.

I. INTRODUCTION

Figure 1:
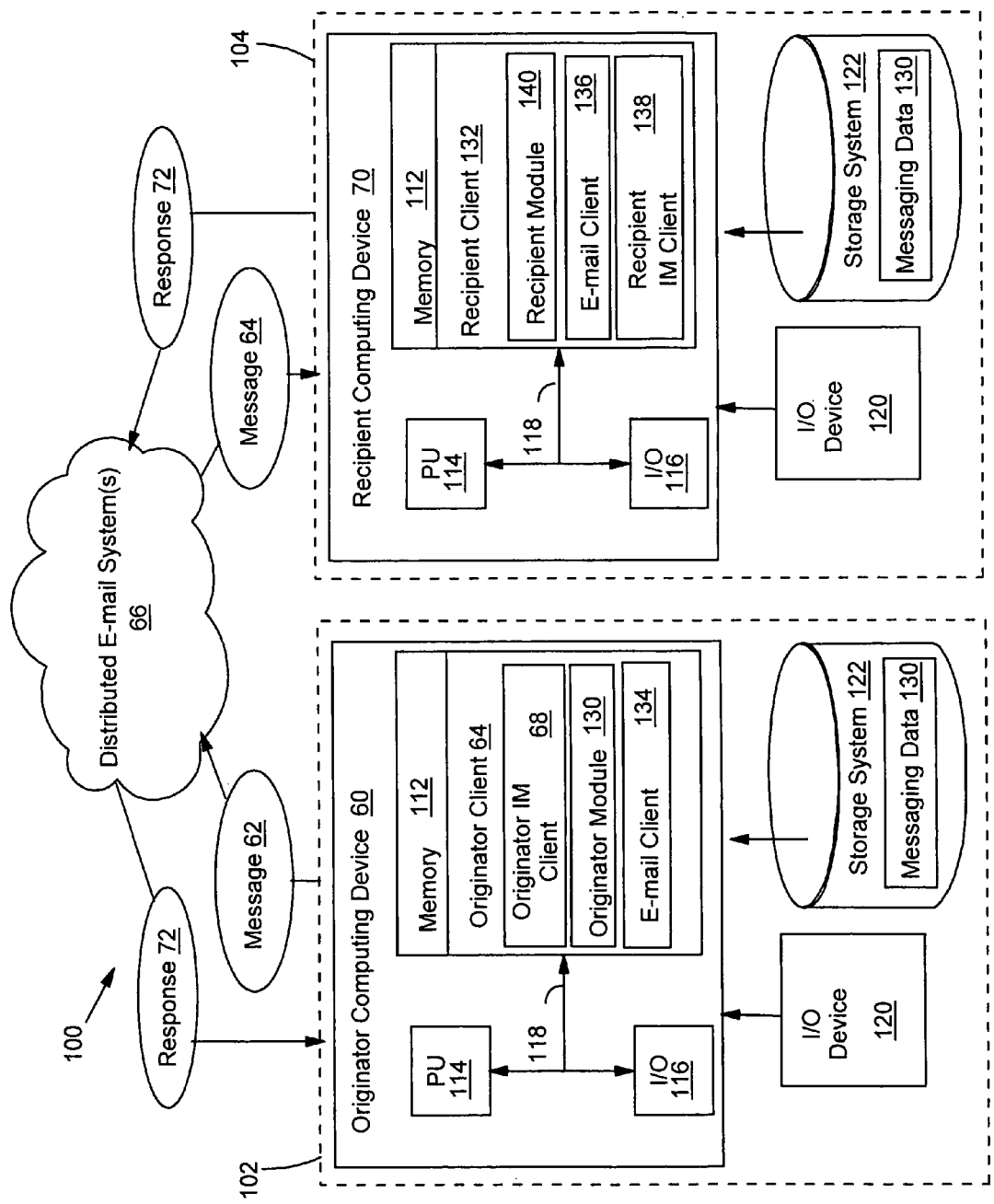
FIG. 1 shows a block diagram of an illustrative environment employing a message communication according to one embodiment of the invention.
Figure 4:
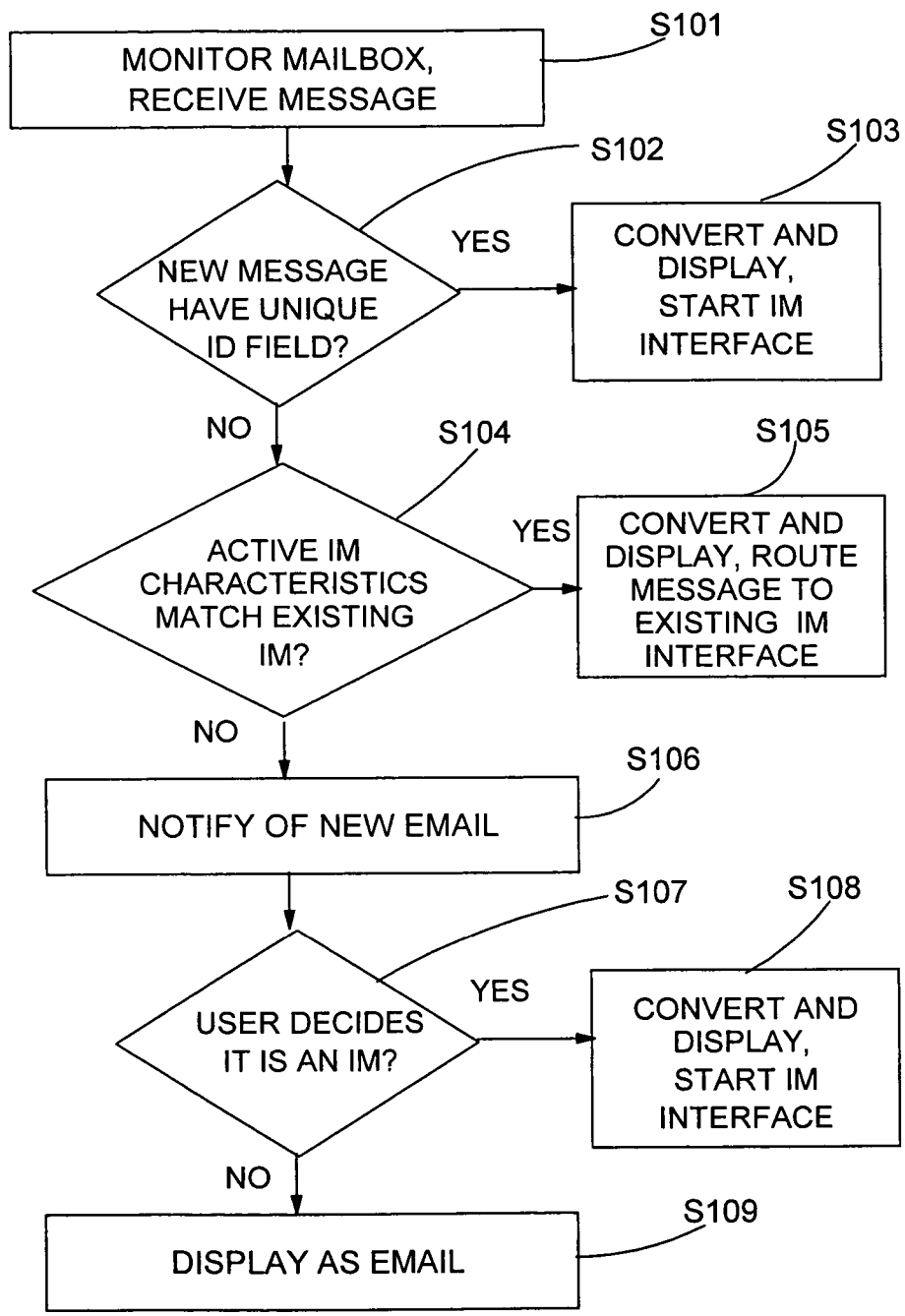
FIG. 4 shows an illustrative graphical user interface for an instant messaging client using the message communication according to one embodiment the invention.
Figure 7:
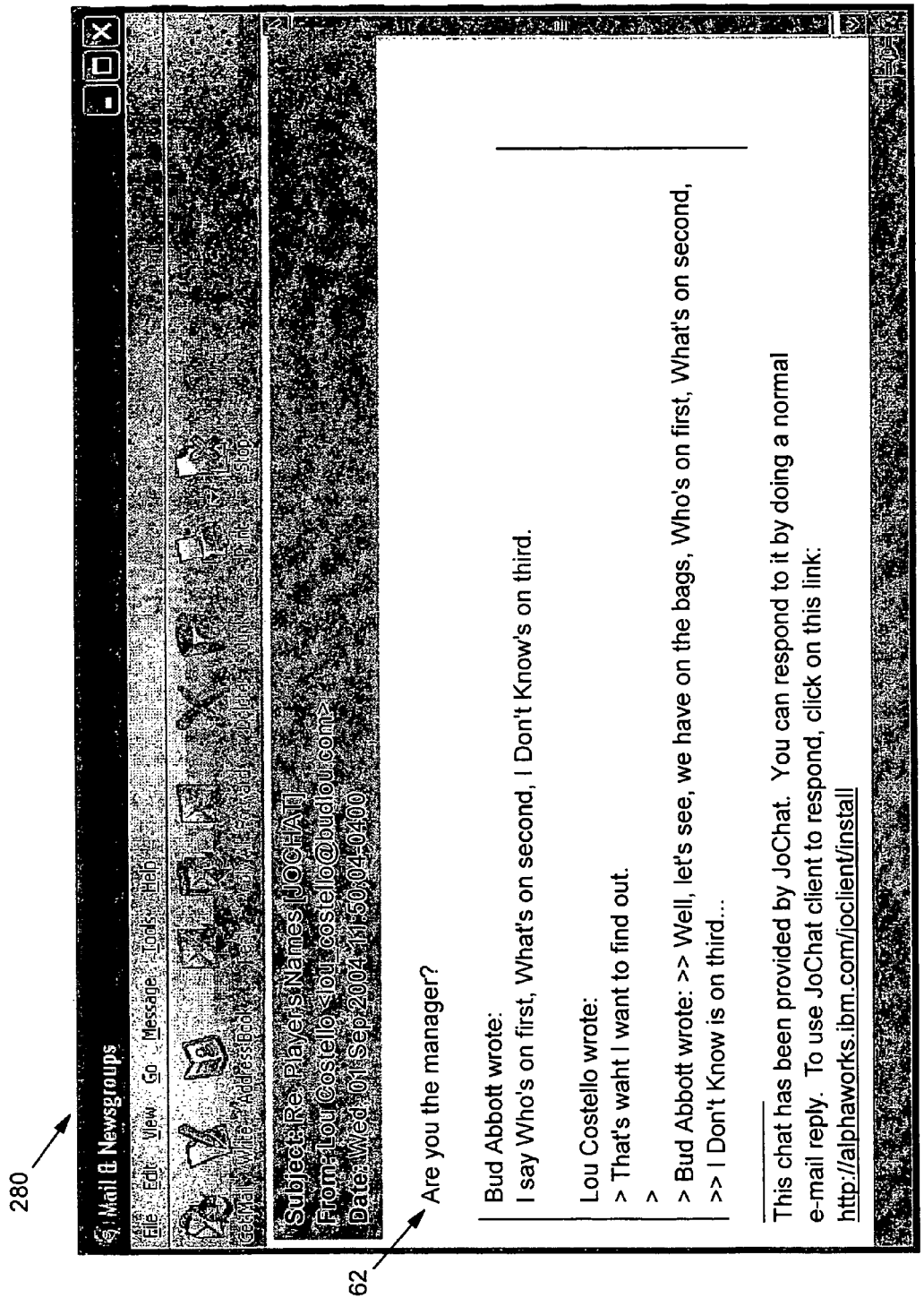
FIG. 7 shows an illustrative graphical user interface for an e-mail client using the message communication according to one embodiment of the invention.

Turning to the drawings, FIG. 1 shows an illustrative environment 100 for one embodiment of message communication according to the invention. In one embodiment, a user of an originator computing device 60 (hereinafter simply "originator 60") composes an original message 62 using an originator client 64 for transmission to a recipient. Message 62 may be composed as an instant message or as an e-mail using originator client 64, and may be an original message or a response 72 to a received message. The focus of the present invention, however, is when message 62 is composed as an instant message using originator client 64. FIG. 4 shows an illustrative instant message graphical user interface (GUI) 200 and FIG. 7 shows an illustrative e-mail GUI 280 that originator client 64 may employ. As will be described in greater detail below, regardless of what format message 62 is composed as (i.e., instant message or e-mail), message 62 is transmitted in an e-mail protocol to one or more recipient computing device(s) 70 (only one shown for clarity) (hereinafter simply "recipient 70") via distributed e-mail system(s) 66. Distributed e-mail system(s) 66 may include any now known or later distributed e-mail servers, e.g., simple mail transfer protocol (SMTP) servers. When message 62 is received by recipient 70, it is determined whether message 62 is to be displayed as an instant message. If message 62 is to be displayed as an instant message, recipient client 132 displays message 62 as such, e.g., using a GUI 200 (FIG. 4), and if message 62 is to be displayed as an e-mail, the message is displayed as such, e.g., using a GUI 280 (FIG. 7). That is, according to one embodiment of the invention, a user may compose message 62 as an instant message, and message 62 can be transmitted using an e-mail protocol and displayed at a recipient as an instant message or an e-mail.

II. ENVIRONMENT OVERVIEW

Originator 60 and recipient 70 computing devices may each be part of a computer infrastructure 102, 104, respectively, that can perform the various process steps described herein for communicating a message and/or receiving and displaying a message. In particular, each computer infrastructure 102, 104 is shown including a computing device including parts for composing a message as an instant message (or an e-mail) and transmitting the message in an e-mail protocol (e.g., originator module 130), and/or for receiving and displaying the message (e.g., recipient module 140) as an e-mail (or an instant message). As illustrated, originator 60 includes features for composing and transmitting message 62 in an e-mail protocol, and recipient 70 includes features for allowing receipt and display of message 62. It is understood, however, that each computing device may also include the same features, allowing composing, transmitting, receiving, determining and displaying of messages. That is, each of originator 60 and recipient 70 may include a combined originator/recipient client 150, as shown in FIG. 8, capable of performing the functions attributed to each.

Turning to the structural details of the computing devices, i.e., originator 60 and recipient 70, each computing device may include substantially similar structure. For example, each computing device may include a memory 112, a processor unit (PU) 114, an input/output (I/O) interface 116, and a bus 118. Further, each computing device is shown in communication with an external I/O device/resource 120 and a storage system 122. As is known in the art, in general, PU 114 executes computer program code that is stored in memory 112 and/or storage system 122. While executing computer program code, PUI 14 can read and/or write data, such as messaging data 130, to/from memory 112, storage system 122, and/or I/O interface 116. Busses 118 provide a communications link between each of the components in each computing device. I/O devices 116 can comprise any device that enables a user to interact with a respective computing device or any device that enables computing devices to communicate with one or more other computing devices.

In any event, each computing device can comprise any general purpose computing article of manufacture capable of executing computer program code installed by a user (e.g., a personal computer, server, handheld device, etc.). However, it is understood that computing devices and computer program code components in memories 112 are only representative of various possible equivalent computing devices that may perform the various process steps of the invention. To this extent, in other embodiments, computing devices can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructures 102, 104 are only illustrative of various types of computer infrastructures for implementing the invention. For example, in one embodiment, computer infrastructure 102 and/or 104 may comprise two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

As previously mentioned and discussed further below, in one embodiment, originator 60 includes an originator client 64 including an originator module 130. In addition, originator client 64 may include an originator instant message (IM) client 68 and an e-mail client 134. E-mail client 134 may include functionality similar to any now known or later developed e-mail clients such as Microsoft Outlook or Lotus Notes. Originator IM client 68 may include functionality similar to any now known or later developed IM client application including those for, for example, Yahoo Instant Messenger, AOL Instant Messenger, Microsoft Messenger, and Lotus Sametime. Recipient 70 includes a recipient client 132 including an e-mail client 136 (e.g., Microsoft Outlook or Lotus Notes) and a recipient module 140. In addition, recipient client 132 may include a recipient IM client 138. Recipient IM client 138 may include functionality similar to any now known or later developed IM client application including those for, for example, Yahoo Instant Messenger, AOL Instant Messenger, Microsoft Messenger, and Sametime. In addition, recipient IM client 138 may use an IM system protocol that is incompatible with that of originator IM client 68 or it may use the same IM system protocol.

Operation of each of these systems is discussed further below. However, it is understood that some of the various systems shown in FIG. 1 can be implemented independently, combined, and/or stored in memory for one or more separate computing devices that are included in computer infrastructure 102, 104. Further, it is understood that some of the systems and/or functionality may not be implemented, or additional systems and/or functionality may be included as part of environment 100.

III. OPERATIONAL METHODOLOGY

Figure 2:
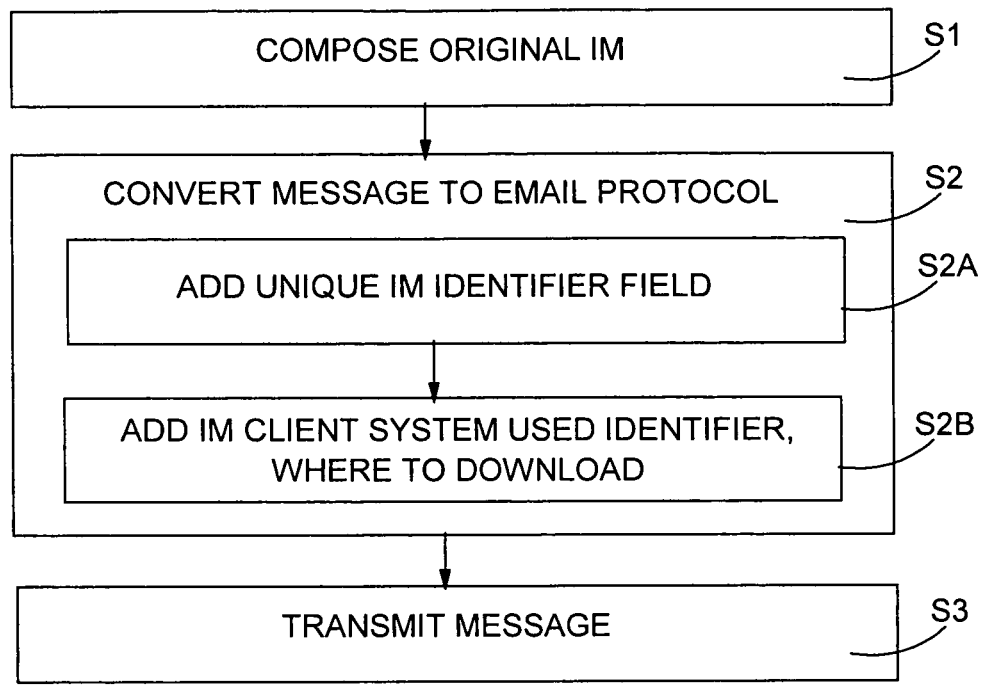
FIG. 2 shows a flow diagram of one embodiment of operation of an originator client according to the invention.

A. Originating Message:

FIG. 2 shows a flow diagram of one embodiment of operation of an originator client 64 including originator module 130 according to the invention. In particular, FIG. 2 shows one embodiment of operation where message 62 is composed as an instant message (IM). In this case, originator IM client 68, i.e., not e-mail client 134, or a composer 232 (FIG. 3) is used to compose an instant message. FIG. 3 shows a block diagram of one embodiment of an originator module 130 according to the invention, including a composer 232 and a transmitter 234.

Referring to FIGS. 1-3, in a first step S1, a user of originator 60 composes message 62 as an instant message. In one embodiment, originator IM client 68 may be used to compose message 62, i.e., it provides a composer. Alternatively, a composer 232 may be provided as part of originator module 130. As noted above, originator IM client 68 may include functionality similar to a client application for any now known or later developed IM system including, for example, Yahoo Instant Messenger, AOL Instant Messenger, Microsoft Messenger, and Lotus Sametime. As known in the art, originator IM client 68 or composer 232 may provide a graphical user interface (GUI) for, inter alia, inputting content to the message and selecting recipients. For example, FIG. 4 shows an exemplary IM GUI 200 showing a thread of messages including message 62 that includes the text by "Abbott" of: "Well, let's see, we have on the bags, Who's on first, What's on second, I Don't Know is on third . . . ." In one embodiment, when a user starts a conversation (chat) and composes a message using originator IM client 68 or composer 232, the user may specify a title for the IM (optional), an e-mail address of who the user is starting a conversation with (possibly picked from a buddy list), and enters the text of message 62.

Returning to FIGS. 1-3, in step S2, transmitter 232 of originator module 130 transmits message 62 using an e-mail protocol via distributed e-mail system(s) 66. This is in contrast to conventional systems that would transmit message 62 in an IM system protocol that may be unusable by a recipient. The e-mail protocol may be any now known or later developed protocol for use by distributed e-mail system(s) 66 and various e-mail clients 134, 136. In one example, the e-mail protocol may include, for example, simple mail transfer protocol (SMTP). SMTP is one standard e-mail protocol on the Internet and part of the TCP/IP protocol suite. SMTP defines the message format and the message transfer agent (MTA), which stores and forwards the mail. Message 62 is communicated via conventional distributed e-mail system(s) 66 to one or more recipient(s) 70. Although transmitter 232 is shown as part of originator module 130, in FIG. 3, it is understood that the transmitting functionality may be invoked using e-mail client 134. Alternatively, where an e-mail client 134 is not present, originator module 130 may include e-mail client functionality sufficient to transmit an e-mail. As shown in FIG. 4, if message 62 is part of an ongoing conversation, message 62 may be sent in a body 206 of the message plus the last few exchanges to give it context.

Step S2 may also include an optional sub-step. In particular, in sub-step S2A, originator module 130 may add a unique IM identifier field to a thread of message 62 so that a recipient module 140 can quickly determine, as will be described in greater detail below, that a received message 62 was composed using an IM client 68, 138. In one embodiment, the e-mail protocol is SMTP, and the unique IM identifier field is added to the typical SMTP fields. For example, a message string for the above statement might appear as:

```
X-Mozilla-Status: 0001
X-Mozilla-Status2: 00800000
Date: Wed, 01 Sep 2004 11:50:04 -0400
From: Lou Costello <lou_costello@budlou.com>
User-Agent: Mozilla Thunderbird 0.7.3 (Windows/20040803)
X-Accept-Language: en-us, en
MIME-Version: 1.0
Subject: Re: Player's Names [JOCHAT]
References: <carv3r$j41$1@w3pilot1b.pok.ibm.com>
<cdgovs$5mt$1@w3pilot2b.pok.ibm.com>
In-Reply-To: <cdgovs$5mt$1@w3pilot2b.pok.ibm.com>
Content-Type: text/plain; charset=us-ascii; format=flowed
Content-Transfer-Encoding: 7bit
X-JoChat-Ident: 83505971
```

Abbott wrote:
 Well, let's see, we have on the bags, Who's on first, What's on second, I Don't Know is on third . . . .
Here, the field entitled "X-JoChat-Ident" is the unique IM identifier field. It is understood, however, that the unique IM identifier field may not be necessary.

As noted above, FIG. 2 shows one embodiment of operation in which message 62 is composed as an instant message using originator client 64. In contrast, when a user wants to start a conversation (chat) as an e-mail, they may invoke e-mail client 134 of originator client 64 to create message 62 addressed to recipient(s) 70, which is transmitted in an e-mail protocol. They may use any subject and contain their message in the body of text just like any conventional e-mail, and the conversation carries on using e-mail clients 134, 136 in a conventional manner. In other words, it is exactly the same as sending a normal e-mail back-and-forth between originator 60 and recipient(s) 70.

Figure 5:
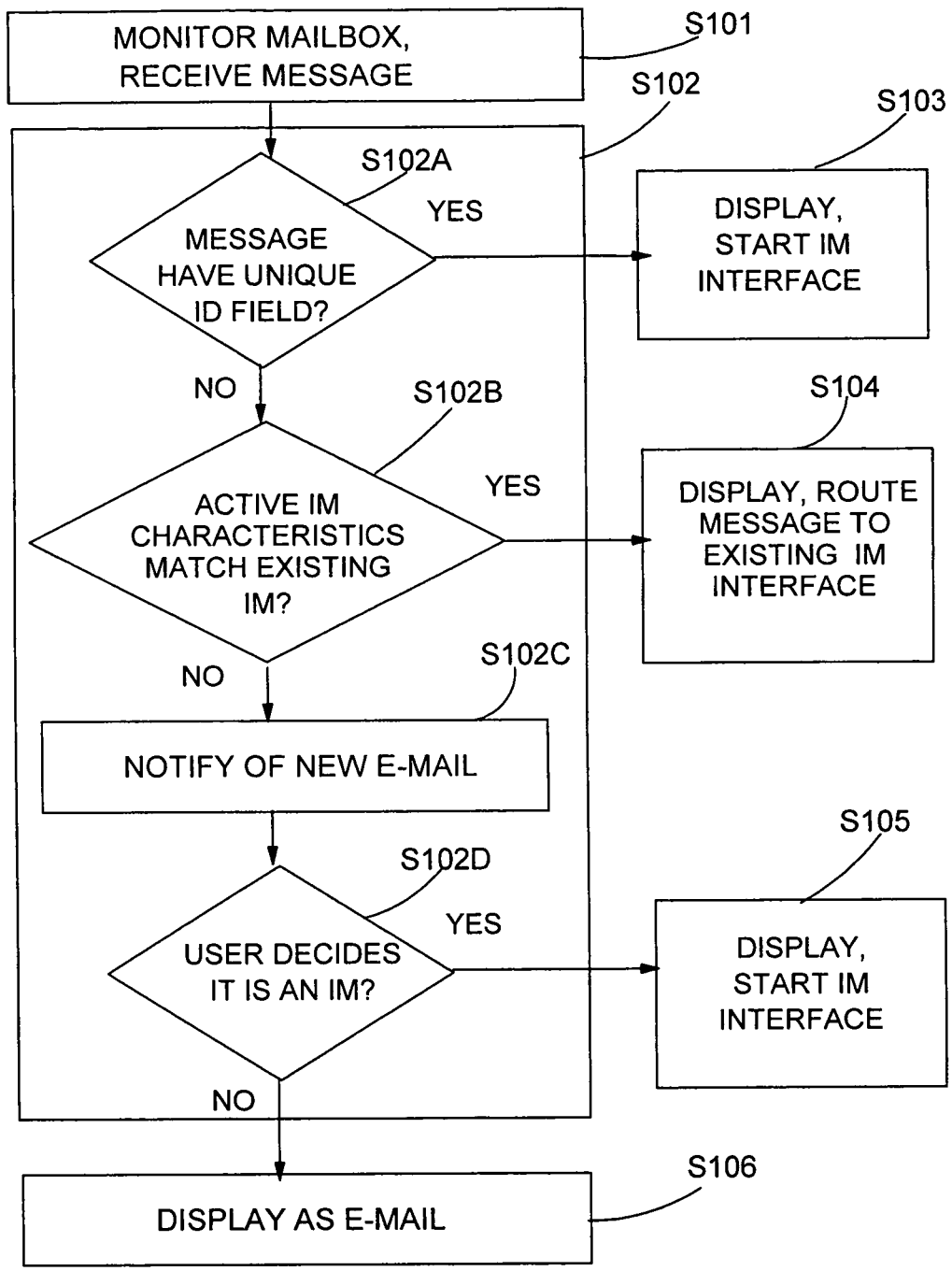
FIG. 5 shows a flow diagram of one embodiment of operation of a recipient client according to the invention.

B. Receiving Message:

FIG. 5 shows a flow diagram of one embodiment of operation of recipient client 132 including recipient module 140 (FIG. 1), e-mail client 136 and recipient IM client 138. As noted above, recipient IM client 138 may employ an IM system protocol that may be compatible with the IM system protocol of originator IM client 68 (e.g., both use Lotus SameTime protocol), or may be incompatible with originator IM client 68 (e.g., one uses Lotus SameTime and the other uses AOL Instant Messaging). If recipient client 132 only includes e-mail client 136 functions, then FIG. 5 is inapplicable and message 62 is treated like any conventional e-mail. FIG. 6 shows a block diagram of one embodiment of recipient module 140 according to the invention. In one embodiment, recipient module 140 includes a receiver 250, a determinator 254, and a displayer 258, each of which will be described in greater detail below.

Referring to FIGS. 1, 5 and 6, in a first step S101, receiver 250 of recipient module 140 monitors a mailbox of e-mail client 136 in a conventional fashion, and receives message 62 at recipient 70. It is understood that although receiver 250 is shown as part of recipient module 140, the functionality may be part of e-mail client 136, if desired. Message 62 is received in an e-mail protocol.

In step S102, determinator 254 determines whether (received) message 62 is to be displayed as an instant message. This step may be implemented in a number of ways. In a first sub-step S102A, determinator 254 determines whether a thread of message 62 includes a unique instant messaging (IM) identifier (ID) field, e.g., as added in sub-step S2A (FIG. 2), indicating that message 62 was composed as an instant message. If YES at sub-step S102A, at step S103, displayer 258 displays message 62 as an instant message using recipient IM client 138 at recipient 70. That is, displayer 258 displays the message using recipient IM client 138 or a separate display function, which will start a new IM interface such as shown in FIG. 4, even though it was transmitted in an e-mail protocol. Message 62 will be displayed using an appropriate I/O device 120, e.g., a monitor, a personal digital assistant, etc.

If NO at sub-step S102A, at sub-step S102B, determinator 254 determines whether the message includes an active IM characteristic of an existing IM in an existing IM interface at recipient 70. An "active characteristic" may include, for example, substantially matching subject line content between message 62 and the existing IM, at least one matching recipient between message 62 and the existing IM, another common attribute between message 62 and an existing IM indicating that they are related, or a combination of the aforementioned. If YES at sub-step S102B, at step S104, displayer 258 displays message 62 as an instant message using recipient IM client 138 or a separate display function at recipient 70. That is, displayer 258 routes message 62 to the existing IM interface, such as shown in FIG. 4, for displaying message 62 using an appropriate I/O device 120. As shown in FIG. 4, message 62 may be added as part of a string of messages 208.

If NO at sub-step S102B, at sub-step S102C, recipient module 140 causes a new e-mail notification to be displayed, i.e., via an appropriate I/O device 120. For example, the e-mail notification may state "You have new e-mail," place an envelope icon in a system tray on the desktop of a user, sound an alarm, or use any other now known or later developed mechanism to alert a user to new e-mail. In this case, at sub-step S102D, determinator 256 allows a user to select whether message 62 is to be displayed as an instant message using recipient IM client 138 or as an e-mail using e-mail client 136. If the user decides it's an IM, i.e., YES at sub-step S102C, at step S105, displayer 258 displays message 62 as an instant message using recipient IM client 138 at recipient 70. That is, displayer 258 will start a new IM interface, such as shown in FIG. 4, for displaying message 62 using an appropriate I/O device 120. If NO at sub-step S102C, at step S106, recipient module 140 causes display of message 62 as an e-mail using e-mail client 136 at recipient 70. FIG. 7 shows one example of an e-mail graphical user interface (GUI) 280 for displaying message 62.

With further regard to steps S103, S104 and S105, if message 62 is part of an ongoing conversation, displayer 258 may also examine the recipient list during the conversion step, and if additional names appear on it, add the names into IM interface 200 (FIG. 4) as new participants. Alternatively, if the message is a removal message, then the participant leaving the conversation is removed from the list of participants by displayer 258.

With special regard to step S102A, S102B and S102D, the embodiments described above have been described with these steps in sequence, it is understood that alternative embodiments may not use the steps in the same sequence, may omit one or more of these steps or may use just one of the steps. For example, in one alternative embodiment, determinator 254 may simply allow a user to select whether message 62 is displayed as an instant message or an e-mail, i.e., use step S102D only.

Again, the above-described methodology is applicable where recipient 70 includes e-mail client 136 and recipient IM client 138. If recipient 70 only includes e-mail client 136, then FIG. 5 is inapplicable and message 62 is treated like any conventional e-mail. In this case, any unique IM identifier field would not be visible in e-mail GUI 280 (FIG. 7).

Response messages 72 are treated in the same manner as described above.

C. Combined Functionality

It is emphasized that while the new functions of originator module 130 and recipient module 140 functions have been described as separate entities, the functions can be combined into a single system, i.e., combined originator/recipient client, for easier application to a computing device. For example, FIG. 8 shows a combined originator/recipient client 150 including the functions of originator module 130 and recipient module 140. That is, a combined originator/recipient client 150 may include: a composer 232 (e.g., as an integral part or as part of an originator IM client 68) for composing a transmit message as an instant message; a transmitter 234 for transmitting the transmit message in an e-mail protocol; a receiver 250 (e.g., as an integral part or as part of an e-mail client 136) for receiving a received message in the e-mail protocol; a determinator 254 for determining whether the received message received by receiver 250 is to be displayed as an instant message; and a displayer 258 for displaying the message as an instant message in the case that the message is determined to be displayed as an instant message, otherwise displaying the message as an e-mail. Furthermore, all of the functions of originator client 64 and recipient client 132 can be combined into combined originator/recipient client 150, i.e., an IM client and an e-mail client may be provided where the functions thereof are not provided separately. In addition, although IM clients 68, 138 and e-mail clients 134,

136 have been illustrated as part of originator client 64 and/or recipient client 132, it is understood that originator module 130 and recipient module 140 functions may be provided as part of, or as plug-ins for, any now known or later developed IM client or e-mail client, or combination thereof.

The above-described embodiments allow use of disparate messaging systems including at least one IM client. In particular, while all of the IM systems are protocol specific, i.e., they only let Yahoo subscribers talk to other Yahoo subscribers, the above-described embodiments allow communication across IM system protocols and e-mail protocols. All that is necessary is that the users have an e-mail address that is electronically accessible (e.g. POP3, IMAP, etc) for incoming messages and access to a SMTP server for outgoing messages. Even users without these electronic interfaces can participate in a one-on-one or n-way conversation. They will just be limited to the one-line e-mails and their e-mail client. Since there is no explicit IM server, the solution is distributed. The load is distributed and there is no single point that can bring the system down.

IV. SPECIAL SITUATIONS

There are a number of special situations that alternative embodiments of the invention address.

One special situation is where a user is added to a conversation from an IM interface 200 (FIG. 4). In particular, from IM interface 200, a user may add another user to the conversation, making it an n-way chat. When this occurs, an initial message 62 is sent by originator client 130 to the added user in the e-mail protocol, much like sending a first message. In this case, originator client 130 or recipient client 140 encodes the unique IM identifier (in extended SMTP fields) for the conversation and the other users. The message will also state, in plain text, that they are being invited to the conversation and who else is participating. Further messages will now also be sent to the added user.

Another situation is adding a user where an e-mail client 134, 136 is used to carry on the conversation. In this case, a user can add another user to a message stream from an e-mail client 134, and originator client 130 or recipient client 140 sends a reply and the additional person is added to the "To" (or "CC") field of message 62 in the e-mail protocol.

Removing a user from a conversation using recipient client 140 is also a special situation. In this case, where a user is using an IM interface, a user wishing to leave a conversation simply closes the IM interface, e.g., GUI 200 in FIG. 4. When this occurs, originator client 130 or recipient client 140 sends a disengagement e-mail, which includes encoded therein the unique ID identifier (in extended SMTP field) and a flag (another extended SMTP field) to indicate the message is a departure message. It will also state, in plain text, that the user is leaving and to remove their name from any further replies, i.e., from "To" and "cc" fields of e-mail GUI 208 (FIG. 7). Where a user is using an e-mail client 134, 136, where a user wishes to leave a conversation, they simply reply to all, as normal, and include a request/instruction in text to "remove me."

V. CONCLUSION

It is understood that the order of the above-described steps is only illustrative. To this extent, one or more steps can be performed in parallel, in a different order, at a remote time, etc. Further, one or more of the steps may not be performed in various embodiments of the invention.

While shown and described herein as methods, program products and system for communicating a message and/or receiving and displaying a message, it is understood that the invention further provides various alternative embodiments. For example, in one embodiment, the invention provides a computer-readable medium that includes computer program code to enable a computer infrastructure to allow use of disparate messaging systems including at least one IM system. To this extent, the computer-readable medium includes program code, such as originator module 130 (FIG. 3) and/or recipient module 140 (FIG. 6) or combined originator/recipient module 150 (FIG. 8), which implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 1) and/or storage system 122 (FIG. 1) (e.g., a fixed disk, a read-only memory, a random access memory, a cache memory, etc.).

In another embodiment, the invention provides a business method that performs the process steps of the invention on a subscription, advertising, and/or fee basis. That is, a service provider, such as an Internet Service Provider, could offer to communicate a message and/or receive and display a message. In this case, the service provider can manage (e.g., create, maintain, support, etc.) a computer infrastructure, such as computer infrastructure 102 (FIG. 1), that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for communicating a message and/or receiving and displaying a message. In this case, a computer infrastructure, such as computer infrastructure 102 and/or 104 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 60, 70 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for communicating a message, the method comprising:
    composing a message as an instant message using an instant message client, the composing including adding an additional field in a thread of the message included in a header of the message, the additional field including a unique instant messaging (IM) identifier, wherein the unique IM identifier indicates that the message is an instant message, was composed using the instant message client, and is to be displayed as an instant message at a recipient; and
    transmitting the message using an e-mail protocol.

2. The method of claim 1, wherein the transmitting includes transmitting the message through at least one e-mail system.

3. The method of claim 1, wherein the email protocol is a simple mail transfer protocol (SMTP).

4. A method for receiving and displaying a message, the method comprising:
    receiving, at a recipient, a message in an e-mail protocol;
    determining whether the message is to be displayed as an instant message, the message being displayed as an instant message in the case that a thread of the message in a header includes a previously added field including a unique instant messaging (IM) identifier indicating that the message is an instant message and was composed using an instant message client; and
    in the case that the message is to be displayed as an instant message, displaying the message as an instant message at the recipient, otherwise displaying the message as an e-mail at the recipient.

5. The method of claim 4, wherein the determining step further includes in the case that the thread of the message does not include the previously added field including a unique instant messaging (IM) identifier, further determining that the message is to be displayed as an instant message in the case that the message includes an active instant messaging (IM) characteristic of an existing instant message in an existing instant message interface at the recipient.

6. The method of claim 5, wherein the active IM characteristic includes at least one of the following: substantially matching subject line content between the message and the existing instant message and at least one matching recipient between the message and the existing instant message.

7. A program product stored on a non-transitory computer-readable storage medium, which when executed, communicates a message, the program product comprising:
    program code for composing a message as an instant message using an instant message client, the program code for composing including program code for adding an additional field in a thread of the message included in a header of the message, the additional field including a unique instant messaging (IM) identifier, wherein the unique IM identifier indicates that the message is an instant message, was composed using the instant message client, and is to be displayed as an instant message at a recipient; and
    program code for transmitting the message using an e-mail protocol.

8. The program product of claim 7, wherein the email protocol is a simple mail transfer protocol (SMTP).

9. The program product of claim 8, wherein the unique instant messaging (IM) identifier field is added to an SMTP field.

10. A program product stored on a non-transitory computer-readable storage medium, which when executed, receives and displays a message, the program product comprising:
    program code for receiving, at a recipient, the message in an e-mail protocol;
    program code for determining whether the message is to be displayed as an instant message, the message being displayed as an instant message in the case that a thread of the message in a header includes a previously added field including a unique instant messaging (IM) identifier indicating that the message is an instant message and was composed using an instant message client; and
    program code for displaying the message as an instant message in the case that the message is determined to be displayed as an instant message, otherwise displaying the message as an e-mail at the recipient.

11. The program product of claim 10, wherein the determining program code, in the case that the thread of the message does not include the previously added field including a unique instant messaging (IM) identifier, further determines that the message is to be displayed as an instant message in the case that the message includes an active instant message (IM) characteristic of an existing instant message in an existing instant message interface at the recipient.

12. The program product of claim 11, wherein the active IM characteristic includes at least one of the following: substantially matching subject line content between the message and the existing instant message and at least one matching recipient between the message and the existing instant message.

13. The program product of claim 10, wherein the email protocol is a simple mail transfer protocol (SMTP).

14. The program product of claim 13, wherein the unique instant messaging (IM) identifier field is added to an SMTP field.

15. A system for communicating a message, the system comprising:
    at least one computing device including:
        a composer for composing a transmit message as an instant message;
        a transmitter for transmitting the transmit message in an e-mail protocol;
        a receiver for receiving a received message in the e-mail protocol;
        a determinator for determining whether the received message received by the receiver is to be displayed as an instant message, wherein the determinator determines that the message is to be displayed as an instant message in the case that a thread of the message in a header includes a previously added field including a unique instant messaging (IM) identifier indicating that the message is an instant message, was composed using an instant message client, and is to be displayed as an instant message at a recipient; and
        a displayer for displaying the message as an instant message in the case that the message is determined to be displayed as an instant message, otherwise displaying the message as an e-mail.

16. The system of claim 15, wherein the determinator, in the case that the thread of the message does not include the previously added field including a unique instant messaging (IM) identifier, further determines that the message is to be displayed as an instant message in the case that the message includes an active instant message (IM) characteristic of an existing instant message in an existing instant message interface at the recipient.

17. The system of claim 16, wherein the active IM characteristic includes at least one of the following: substantially matching subject line content between the message and the existing instant message and at least one matching recipient between the message and the existing instant message.

18. The system of claim 15, wherein the email protocol is a simple mail transfer protocol (SMTP).

19. The system of claim 18, wherein the unique instant messaging (IM) identifier field is added to an SMTP field.

\* \* \* \* \*